(12) United States Patent
Livne et al.

(10) Patent No.: US 11,348,051 B2
(45) Date of Patent: *May 31, 2022

(54) APPLICATION USAGE AND PROCESS MONITORING IN AN ENTERPRISE ENVIRONMENT HAVING AGENT SESSION RECORDING FOR PROCESS DEFINITION

(71) Applicant: IEX Corporation, Richardson, TX (US)

(72) Inventors: Eshai Livne, Karkur (IL); Itai Nahshon, Haifa (IL); Paul Harold Leamon, McKinney, TX (US)

(73) Assignee: IEX CORPORATION, Richardson, TX (US)

( * ) Notice: Subject to any disclaimer, the term of this patent is extended or adjusted under 35 U.S.C. 154(b) by 89 days.

This patent is subject to a terminal disclaimer.

(21) Appl. No.: 16/988,813

(22) Filed: Aug. 10, 2020

(65) Prior Publication Data
US 2020/0372425 A1 Nov. 26, 2020

Related U.S. Application Data

(63) Continuation of application No. 13/340,177, filed on Dec. 29, 2011, now Pat. No. 10,783,474.

(51) Int. Cl.
G06Q 10/06 (2012.01)
(52) U.S. Cl.
CPC ... *G06Q 10/0639* (2013.01); *G06Q 10/06315* (2013.01); *G06Q 10/06395* (2013.01)
(58) Field of Classification Search
None
See application file for complete search history.

(56) References Cited

U.S. PATENT DOCUMENTS

| | | | |
|---|---|---|---|
| 5,903,269 | A | 5/1999 | Poreh et al. |
| 6,040,832 | A | 3/2000 | Poreh et al. |
| 6,222,542 | B1 | 4/2001 | Poreh et al. |
| 6,542,602 | B1 | 4/2003 | Elazar |
| 6,959,079 | B2 | 10/2005 | Elazar |

(Continued)

OTHER PUBLICATIONS

"Back Office—The Next Competitive Battlefield", A Verint System White Paper, Verint Systems Inc., 330 South Service Road, Melville, NY, 11747, 2008.

(Continued)

*Primary Examiner* — Stephanie Z Delich
(74) *Attorney, Agent, or Firm* — Pearl Cohen Zedek Latzer Baratz LLP

(57) ABSTRACT

A real-time activity monitor (RTAM) operates within or in association with a machine (such as a desktop) within a back office environment to automatically track and record desktop processing activities, application usage, as well as manual processing. The real-time activity monitor provides visibility into real-time task processing at the client desktop to enable an enterprise to address back office operational inefficiencies that are exposed by the data. According to a further feature, a recording approach is used to enable a user of the system to automatically define processes and tasks to be monitored. The approach obviates manual configuration by recording application usage actions and then using these interactions as a template for a new process object to be monitored. In an alternative embodiment, the process recorder captures screenshots and enables screen element bookmarking.

18 Claims, 12 Drawing Sheets

(56) References Cited

U.S. PATENT DOCUMENTS

| | | |
|---|---|---|
| 8,078,486 B1 | 12/2011 | McLean et al. |
| 8,108,237 B2 | 1/2012 | Bourne et al. |
| 9,015,677 B2 | 4/2015 | Tunik et al. |
| 9,167,093 B2 | 10/2015 | Geffen et al. |
| 2001/0010541 A1 | 8/2001 | Fernandez et al. |
| 2006/0248472 A1 | 11/2006 | Helie et al. |
| 2008/0256399 A1 | 10/2008 | Erdosi et al. |
| 2009/0018731 A1 | 1/2009 | Grenell et al. |
| 2009/0049394 A1 | 2/2009 | Ricketts |
| 2010/0064215 A1 | 3/2010 | Portman et al. |
| 2010/0174992 A1 | 7/2010 | Portman et al. |
| 2011/0071869 A1 | 3/2011 | O-Brien et al. |
| 2011/0218841 A1 | 9/2011 | Deshmukh et al. |
| 2012/0198390 A1 | 8/2012 | Bogusky et al. |
| 2013/0110588 A1 | 5/2013 | Livne et al. |
| 2014/0149488 A1 | 5/2014 | Bialy et al. |
| 2014/0280431 A1 | 9/2014 | Shelest |

OTHER PUBLICATIONS

"Impact 360 Quality Monitoring", A Verint System White Paper, Verint Systems Inc., 330 South Service Road, Melville, NY, 11747, May 2008.

| Recording | | | | | | | | | | |
|---|---|---|---|---|---|---|---|---|---|---|
| Application | Window Title | Browser URL | Selection | Time | Duration | Object Name | Trigger Type | Operator | Right Argument | Combination |
| WINWORD | barbara.docx - Microsoft Word | | Application | 4:29:20 PM | 14 | | Ignored | Equals | WINWORD | AND And |
| explorer | Start Menu | | Application | 4:29:34 PM | 1 | | Ignored | Equals | explorer | AND And |
| explorer | | | Application | 4:29:35 PM | 0 | | Ignored | Equals | explorer | AND And |
| explorer | Run | | Application | 4:29:35 PM | 4 | | Ignored | Equals | explorer | AND And |
| explorer | Program Manager | | Application | 4:29:40 PM | 0 | | Ignored | Equals | explorer | AND And |
| calc | Calculator | | Application | 4:29:40 PM | 12 | | Ignored | Equals | calc | AND And |
| explorer | | | Application | 4:29:52 PM | 1 | | Ignored | Equals | explorer | AND And |
| iexplore | Windows Internet... | | Application | 4:29:53 PM | 1 | | Ignored | Equals | iexplore | AND And |
| iexplore | http://niceweb.ni... | | Application | 4:29:54 PM | 2 | | Ignored | Equals | iexplore | AND And |
| iexplore | http://niceweb.ni... | http://niceweb.ni... | Browser Url | 4:29:56 PM | 0 | | Ignored | Equals | http://niceweb.ni... | AND And |
| iexplore | NiCEweb - Home... | http://niceweb.ni... | Browser Url | 4:29:56 PM | 14 | | Ignored | Equals | http://niceweb.ni... | AND And |
| iexplore | NiCEweb - Home... | http://www.ynet,... | Browser Url | 4:30:10 PM | 0 | | Ignored | Equals | http://www.ynet,... | AND And |
| iexplore | http://www.ynet,... | http://www.ynet,... | Browser Url | 4:30:10 PM | 0 | | Ignored | Equals | http://www.ynet,... | AND And |
| iexplore | ynet ןון גדות... | http://www.ynet,... | Browser Url | 4:30:11 PM | 9 | | Ignored | Equals | http://www.ynet,... | AND And |
| calc | Calculator | | Application | 4:30:19 PM | 5 | | Ignored | Equals | calc | AND And |
| calc | | | Application | 4:30:25 PM | 0 | | Ignored | Equals | calc | AND And |
| WINWORD | barbara.docx - Mi... | | Application | 4:30:25 PM | 11 | | Ignored | Equals | WINWORD | AND And |

*FIG. 9*

| Recording | | | | | | | | | | |
|---|---|---|---|---|---|---|---|---|---|---|
| Application | Window Title | Browser URL | Selection | Time | Duration | Object Name | Trigger Type | Operator | Right Argum | Combinat |
| WINWORD | barbara.docx - Mi... | | Application | 4:29:20 PM | 14 | My Process | Process St... | Equals | WINWORD | AND And |
| explorer | Start Menu | | Application | 4:29:34 PM | 1 | task1 | Task Start | Equals | explorer | AND And |
| explorer | | | Application | 4:29:35 PM | 0 | | Ignored | Equals | explorer | AND And |
| explorer | Run | | Application | 4:29:35 PM | 4 | task1 | Task Stop | Equals | explorer | AND And |
| explorer | | | Application | 4:29:40 PM | 0 | task1 | Task Start | Equals | explorer | AND And |
| explorer | Program Manager | | Application | 4:29:40 PM | 0 | | Ignored | Equals | explorer | AND And |
| calc | Calculator | | Application | 4:29:40 PM | 12 | | Ignored | Equals | calc | AND And |
| explorer | | | Application | 4:29:52 PM | 1 | task1 | Task Stop | Equals | explorer | OR Or |
| iexplore | Windows Internet... | | Application | 4:29:53 PM | 1 | | Ignored | Equals | iexplore | AND And |
| iexplore | http://niceweb.ni... | | Application | 4:29:54 PM | 2 | My Process | Process St... | Equals | iexplore | AND And |
| iexplore | http://niceweb.ni... | http://niceweb.nice... | Browser Url | 4:29:56 PM | 0 | | Ignored | Equals | http://nicew... | AND And |
| iexplore | NiCEweb - Home... | http://niceweb.nice,... | Browser Url | 4:29:56 PM | 14 | | Ignored | Equals | http://nicew... | AND And |
| iexplore | NiCEweb - Home... | http://www.ynet.co,... | Browser Url | 4:30:10 PM | 0 | | Ignored | Equals | http://www.... | AND And |
| iexplore | http://www.ynet,... | http://www.ynet.co... | Browser Url | 4:30:10 PM | 0 | | Ignored | Equals | http://www.... | AND And |
| iexplore | ynetןן ןוןת ןוןתן... | http://www.ynet.co.... | Browser Url | 4:30:11 PM | 9 | | Ignored | Equals | http://www.... | AND And |
| calc | Calculator | | Application | 4:30:19 PM | 5 | | Ignored | Equals | calc | AND And |
| calc | | | Application | 4:30:25 PM | 0 | | Ignored | Equals | calc | AND And |
| WINWORD | barbara.docx - Mi... | | Application | 4:30:25 PM | 11 | | Ignored | Equals | WINWORD | AND And |

*FIG. 12*

| Recording | | | | | | | | | | | |
|---|---|---|---|---|---|---|---|---|---|---|---|
| Application | Window Title | Browser URL | Selection | Time | Duration | Object Name | Trigger Type | Operator | Right Argum | Combin | |
| WINWORD | barbara.docx - Mi... | | Application | 4:29:20 PM | 14 | My Process | Ignored | Equals | WINWORD | AND And | |
| explorer | Start Menu | | Application | 4:29:34 PM | 1 | task1 | Task Start | Equals | explorer | AND And | |
| explorer | | | Application | 4:29:35 PM | 0 | | Ignored | Equals | explorer | AND And | |
| explorer | Run | | Application | 4:29:35 PM | 4 | task1 | Task Stop | Equals | explorer | AND And | |
| explorer | | | Application | 4:29:40 PM | 0 | task1 | Task Start | Equals | explorer | AND And | |
| explorer | Program Manager | | Application | 4:29:40 PM | 0 | | Ignored | Equals | explorer | AND And | |
| calc | Calculator | | Application | 4:29:40 PM | 12 | | Ignored | Equals | calc | AND And | |
| explorer | | | Application | 4:29:52 PM | 1 | task1 | Task Stop | Equals | explorer | OR Or | |

| Recording | | | | | | | | | |
|---|---|---|---|---|---|---|---|---|---|
| Application | Window Title | Browser URL | Selection | Time | Duration | Object Name | Trigger Type | Operator | Rig |
| WINWORD | barbara.docx - Mi... | | Application | 4:29:20 PM | 14 | My Process | Process St... | Equals | wi |
| explorer | Start Menu | | Application | 4:29:34 PM | 1 | task1 | Task Start | Equals | exp |
| explorer | | | Application | 4:29:35 PM | 0 | | Ignored | Equals | exp |
| explorer | Run | | Application | 4:29:35 PM | 4 | task1 | Task Stop | Equals | exp |
| explorer | | | Application | 4:29:40 PM | 0 | task2 | Task Start | Equals | exp |
| explorer | Program Manager | | Application | 4:29:40 PM | 0 | | Ignored | Equals | cal |
| calc | Calculator | | Application | 4:29:40 PM | 12 | | Ignored | Equals | exp |
| explorer | | | Application | 4:29:52 PM | 1 | task2 | Task Stop | Equals | iex |
| iexplore | Windows Internet... | http://niceweb.ni... | Application | 4:29:53 PM | 1 | | Ignored | Equals | iex |
| iexplore | http://niceweb.ni... | http://niceweb.ni... | Browser Url | 4:29:54 PM | 2 | | Ignored | Equals | htt |
| iexplore | http://niceweb.ni... | http://niceweb.ni... | Browser Url | 4:29:56 PM | 0 | My Process | Process St... | Equals | htt |
| iexplore | NICEweb - Home... | http://www.ynet.... | Browser Url | 4:29:56 PM | 14 | | Ignored | Equals | htt |
| iexplore | NICEweb - Home... | http://www.ynet.... | Browser Url | 4:30:10 PM | 0 | | Ignored | Equals | htt |
| iexplore | http://www.ynet.... | http://www.ynet.... | Browser Url | 4:30:10 PM | 0 | | Ignored | Equals | htt |
| iexplore | ynet เน เข ุเเก... | | Browser Url | 4:30:11 PM | 9 | | Ignored | Equals | cal |
| calc | Calculator | | Application | 4:30:19 PM | 5 | | Ignored | Equals | cal |
| calc | | | Application | 4:30:25 PM | 0 | | Ignored | Equals | wi |
| WINWORD | barbara.docx - Mi... | | Application | 4:30:25 PM | 11 | | Ignored | Equals | wi |

Filter (Showing 18 of 18 events)
Filter By: None ▼ Equals ▼

Recorded Event 4 of 18
Trigger Type: Task Stop ▼ Time/Duration: 4:29:35 PM / 4 sec
Object Name: Task1 ▼ Combination: AND ▼
Left Argument    Operator    Right Argument
Application: ● explorer    Equals ▼    explorer
Browser URL: ○
Window Title: ○ Run

[ Apply Filter ]

APPLICATION USAGE AND PROCESS MONITORING IN AN ENTERPRISE ENVIRONMENT HAVING AGENT SESSION RECORDING FOR PROCESS DEFINITION

PRIOR APPLICATION DATA

The present application is a continuation of prior application Ser. No. 13/340,177 filed on Dec. 29, 2011 entitled "APPLICATION USAGE AND PROCESS MONITORING IN AN ENTERPRISE ENVIRONMENT HAVING AGENT SESSION RECORDING FOR PROCESS DEFINITION", incorporated by reference herein in its entirety.

BACKGROUND OF THE INVENTION

Technical Field

The disclosed subject matter relates generally to computer-implemented monitoring of agent performance within an enterprise (e.g., back office) workplace environment.

Background of the Related Art

Workforce management systems are well-known in the prior art. Such systems integrate many management functions, such as workforce forecasting and scheduling, skill planning and scheduling, multimedia contact management, and the like. A representative commercial system of this type is TotalView® workforce management, from IEX Corporation. Workforce Management software enables even the most complex multi-site, multi-skill and multi-channel contact centers to forecast staffing needs, schedule their representatives' time, and effectively manage change every day.

An enterprise's back office operations often are out of sight, but to corporate management, they are rarely out of mind. An enterprise's back office staff typically handles the work that is designed to keep the business running smoothly and efficiently. These include, for example, processing insurance claims and associated payments, home loan applications, credit card applications, complicated help desk trouble tickets that require various off-phone research and analysis work, and the like. Ably managing the back office requires accurate forecasting and scheduling that balances workload with staffing resources, as well as capturing and understanding employee activity.

Historically, the contact center was the epicenter of the workforce management revolution, and for good reason. In the contact center, seconds count. Customer contacts come with high volume and frequency, and the issues they represent often require immediate resolution. Thus, the need arose to develop techniques to monitor agent activities, refine predictions of contact patterns and resolution times, and optimize agents' time to meet demand. Meanwhile, however, the sophistication of back office management information and management information systems has lagged. Compared to the copious amount of data collected and processed about contact center operations, the back office provides little or no comparable information.

To address this problem, it is desirable to implement robust and scalable desktop application monitoring so that back office managers can obtain an accurate view of the time employees take to complete tasks that are required to complete one or more defined business processes.

BRIEF SUMMARY

A real-time activity monitor (RTAM) operates within or in association with a machine (such as a desktop personal computer or PC) within a back office environment to automatically track and record desktop processing activities, application usage, as well as allowing data entry for manual processing. The real-time activity monitor provides visibility into real-time task processing at the client desktop to enable an enterprise to address back office operational inefficiencies that are exposed by the data.

Preferably, the data collection and display techniques herein are based on the concept of a business office work item. These work items may go through multiple teams or steps before they are completed. For example, a home loan may first go through a loan application review team, then to an underwriting team, then to a processing team, and then to a funding team. An employee may or may not have multiple skills to work on multiple processing teams or steps. Within each step is a business office "process." Thus, for example, a "process" may refer to a back office business process that comprises a set of "tasks." A "process" has a "start" and an "end," and typically one or more local or remotely-accessible applications may be used to carry out the process. An employee may operate on several business processes concurrently. In the alternative, a single work item may have a review step that corresponds to the "claim review" business process, in which case it may be required that more than one person review the claim before it can be completed. Therefore, a work item being processed in a step may be "touched" by multiple employees before it can be said to be completed. These "touches" are referred to as a business process instance. In addition, single touches in a business process step by the same employee for different work items are also business process instances, as well as multiple touches for the same item by the same employee. For example, an employee might start reviewing a claim just before the end of their work day, then he or she may finish it the beginning of his or her next work day.

In a representative embodiment, a real-time activity monitor is implemented as several functions that operate on the client desktop, namely: a business "process" monitor, an application monitor, and an employee work journal. The process monitor captures and records applications and activities on the client desktop, including, without limitation, the execution of business processes (including concurrent processes) and tasks associated with a process. The application monitor tracks active applications and web page usage, including across remote environments. A business rule engine facilitates the data collection, and system reports intelligently visualize employee work.

According to a further feature, a recording approach is used to enable a user of the system to automatically define processes and tasks to be monitored. The approach obviates manual configuration by recording application usage actions and then using these interactions as a template for a new process object.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 9 illustrates a representative recording pane and the events captured therein during the recording session;

FIG. 12 illustrates how to combine various event lines using the display interface;

FIG. 13 illustrates the result of a combination operation;

FIG. 14 illustrates an embodiment of the recorder interface and how the user can select an event in the events pane and then edit information for that event in the recorded event pane;

FIG. 18 illustrates an assignment tool for use in enabling the user to bookmark the screen element or, in this example, to ignore it (by not making a selection);

FIG. 19 illustrates the assignment tool when the user selects a property/event and applies condition parameters with respect to the SE; and FIG. 20 illustrates how a SE bookmark defined in FIG. 19 is presented in the event pane (as a row in the events log).

DETAILED DESCRIPTION OF AN ILLUSTRATIVE EMBODIMENT

As noted above, preferably the data collection and display techniques herein are based on the concept of a business office "process." Thus, as used herein, typically a "process" (such as, but without limitation, a back office business, a contact center process, or the like) comprises a set of "tasks." A "process" has a "start" and an "end," and typically one or more applications may be used to carry out the process. An employee (or, more generally, an "agent") may operate on several business processes concurrently. Likewise, a business process may be "touched" by multiple employees after it is starts and before it is complete. An example process would be a "trouble ticket" process having a particular unique work item identifier (e.g., trouble ticket #1234). This particular work item process may be initiated by a first agent, who may then pass the work item to a second agent, and so on, until the business process step is completed. A particular task within the process instance may also require access to another entity's application via a remote access session. According to this disclosure then, a process to handle a unique work item may be carried out by more than one agent, and it may include one or more tasks, each of which may be carried out using applications that execute on a desktop (a particular agent's desktop, or a desktop remotely accessible to the agent).

Figure 1:
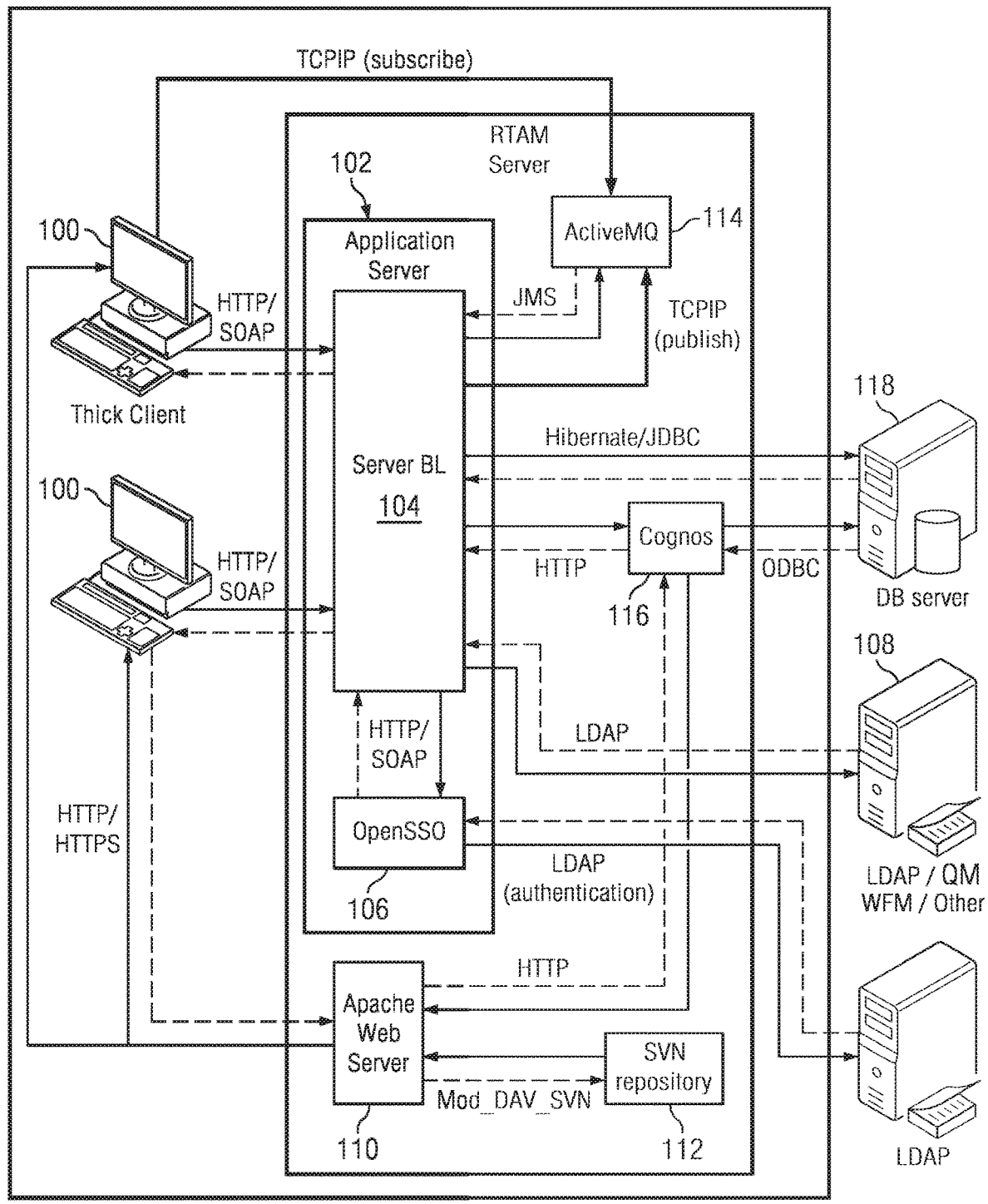
FIG. 1 is an illustrative enterprise machine and server architecture in which the disclosed subject matter may be implemented.

With the above as background, FIG. 1 illustrates a representative computer architecture in which the disclosed subject matter may be implemented. This architecture is not intended to be limiting.

Typically, the architecture is located within an enterprise firewall (or other secure boundary), however, this is not a limitation either. Portions of the architecture may reside externally to an enterprise, and/or be implemented as a managed or hosted service offering. In an alternative implementation, portions of the architecture may be implemented in the context of an information technology delivery model known as cloud computing, by which shared resources, software and information are provided over the Internet to computers and other devices on-demand. With this approach, an application instance can be hosted and made available from Internet-based resources that are accessible over HTTP through a conventional Web browser.

The various technologies illustrated in the drawing are well-known to one of ordinary skill in the art. Thus, familiarity with the various applications, protocols and functions are presumed. In a representative embodiment, the architecture shown in FIG. 1 includes a plurality of client machines 100. These are the machines that are desired to be monitored according to the real-time activity monitoring techniques of this disclosure. The client machines 100 include both "thick" and "thin" clients. In particular, it is known in the prior art to integrate Web- or cloud-based applications with so-called "thick" (or "rich") clients, where a "thick" client is a client (of a client-server application) that supports its own interface (as opposed to merely exporting the web interface from the web application itself). A "thin" client, in contrast, typically is browser-based. An application server 102 executes server business logic 104 for the enterprise application(s), and it executes a single sign-on (SSO) application 106 to provide identity-based authentication. The application server may be implemented by Apache Tomcat, BEA® WebLogic®, IBM® WebSphere®, or the like. As is well-known, SSO is an access control mechanism which enables a user to authenticate once (e.g., by providing a user name and password) and gain access to software resources across multiple systems. Typically, an SSO application 106 enables user access to resources within an enterprise or an organization. The SSO application interacts with one or more directory servers 108, which store information about permitted users within a directory service, such as an LDAP-compliant directory. LDAP is an application protocol for querying and modifying directory services running over TCP/IP. A web server 110 provides web pages (both in the clear and over secure transport) and other HTTP-based objects to the clients. Web server 110 interacts with a version control repository 112. A middleware server 114 (such as one based on IBM® MQSeries® technologies) manages communications across the different platforms. A reporting server 116 (such as implemented commercially by Cognos®) uses an associated database server 118, and these servers provide a database schema to facilitate report generation as well as storing business logic, configuration data and administration information. The database supports known database management systems, such as Oracle® 10g, Microsoft® SQL Server, MySQL, or the like. Reports may be generated as web pages that are then displayed to permitted users, such as back office supervisors and managers. As indicated, where appropriate, communications across the architecture may be encrypted (e.g., using SOAP over HTTPS). Typically, client-server interactions within the architecture are formatted to conform to the Simple Object Access Protocol (SOAP) and travel over HTTP, or to any other reliable transport mechanism, as illustrated.

Employee "desktops" as used herein should be broadly construed to include conventional desktops, laptops, notebook computers, as well as tablets, smart phones and other mobile devices. A desktop machine may be coupled to any other entity within the disclosed architecture in any known manner, including via wire-line and wireless networks.

The system may include a mechanism to create, store, assign, and download to the client one or more "solution" files, which describe the work items. Preferably, solution files are created, stored on the server, assigned to employees based on the nature of the work they do, and then downloaded to the client desktop based on the employee assignments.

The real-time activity monitor (RTAM) of this disclosure may be implemented as a client-server application. Typically, and as will be seen, the client-side of the application executes on or in association with a client machine 100, and the server-side of the application executes on or in association with the application server 102 and/or the web server 110.

Figure 2:
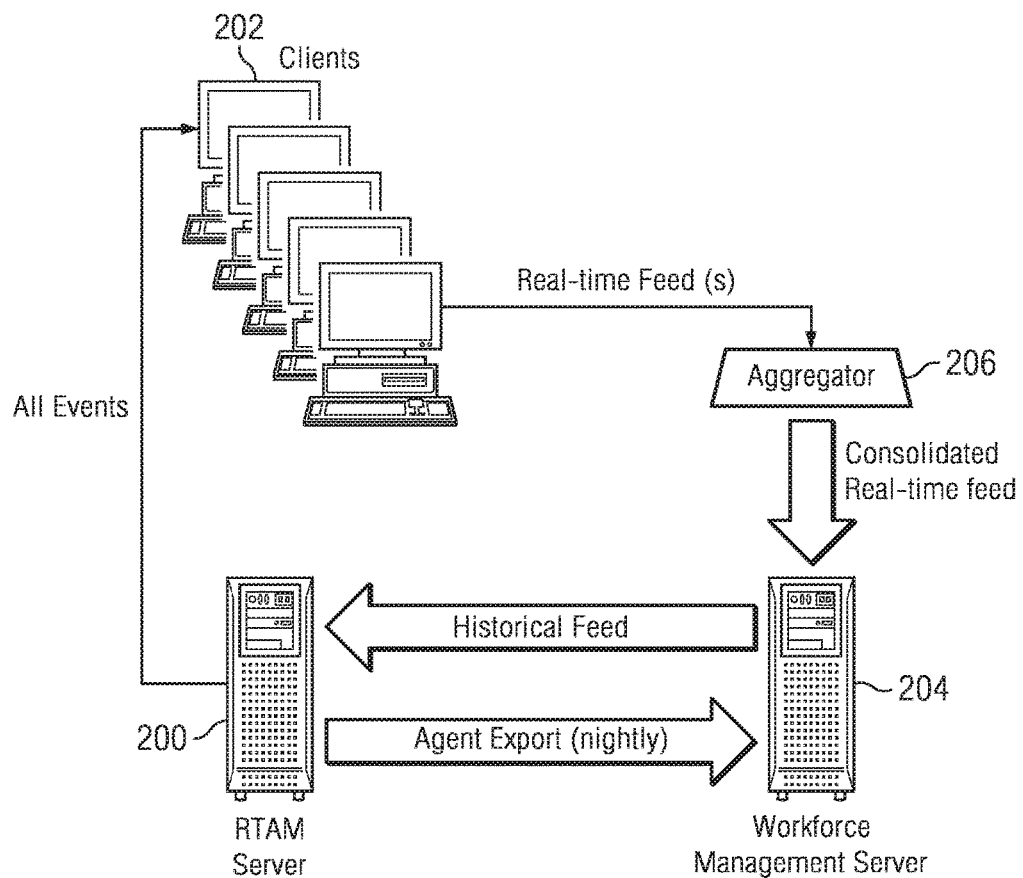
FIG. 2 illustrates a representative implementation of a real-time activity monitor (RTAM) that is integrated with a workforce management (WFM) system.

In an enterprise (e.g., back office) environment, typically employees are primarily responsible for completing work items. These work items can be any combination of discrete work units, such as processing faxes, claims, cases, tickets, and the like, to handle a work item. It is desirable to monitor employees as they carry out (or fail to carry out) these activities so as to provide management (or others) with information regarding workflow and efficiencies. In one embodiment, and as will be described, the RTAM subject matter herein is implemented within or in conjunction with a back office suite of applications. These applications enable data collection and analysis from the back office, and they may provide that data to a Workforce Management (WFM) system to facilitate forecasting, scheduling, change management and performance management. A representative WFM system is IEX TotalView®, which is a commercial system marketed by IEX Corporation, Richardson, Tex. The back office suite may comprise an RTAM application. The RTAM application typically comprises desktop process monitor, desktop application monitor and employee work journal modules to enable the collection and reporting of information from any agent desktop application, which data can then be viewed in system screens and reports in a meaningful way. One of more of these modules may be integrated. FIG. 2 illustrates a representative implementation. In this example embodiment, the servers host two (2) different platforms. An RTAM server 200 communicates with clients 202 on employee desktops. Server 200 receives real-time information about processes and active applications, and that data is stored within an associated server database. Preferably, the information received from the employee desktop machines is packaged by the RTAM server 200, and this server 200 also may be configured to send historical feeds to populate queue history on the workforce management (WFM) server 204. This enables the collected data to be used to facilitate WFM tasks. As illustrated, each client 202 also may be configured to send real-time active application information to an aggregator machine or function 206. Preferably, the aggregator 206 consolidates the real-time messages from multiple clients and appears as a single real-time feed to populate real-time enabled display views exported by the workforce management server 204.

Figure 3:
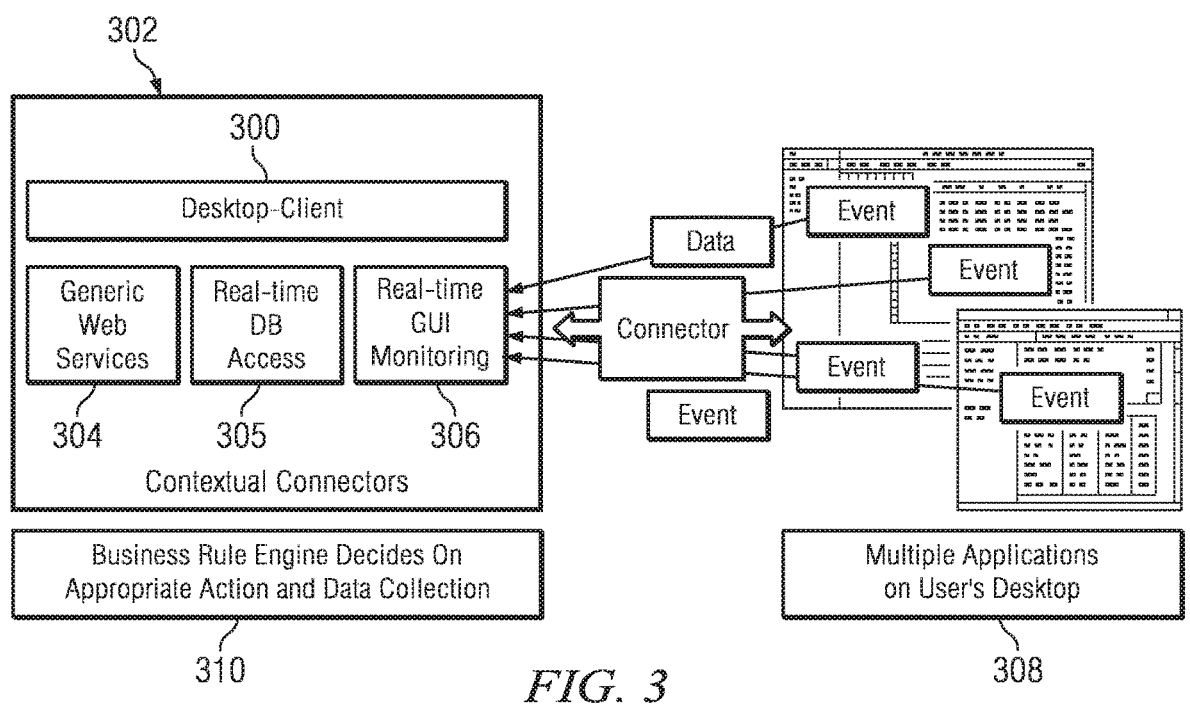
FIG. 3 illustrates a high level operation of a desktop process monitor and application process monitor according to this disclosure.

FIG. 3 illustrates the high level operation of the desktop process monitor and application process monitor of this disclosure. The monitors may be discrete functions or operations, or they may be integrated. In the illustrated embodiment, a desktop client application 300 executes within or in association with the client machine and provides a set of contextual connectors 302. The connectors 302 include a generic web services connector 304, a real-time database access connector 305, and a real-time graphical user interface (GUI) monitoring connector 306. The connectors may be discrete software modules, or they may be integrated. The real-time GUI monitoring connector 306 operates to monitor data and events occurring with respect to multiple applications 308 that are executing on the user's desktop. Typically, and as is well-known in the context of a multi-tasking operating system, it is possible to open and run multiple applications within a single desktop operating environment. An individual employee may have several back office applications open, while at the same time be connected to his or her Facebook page, personal e-mail (such as Gmail), and the like. As a consequence, the execution of multiple applications in this manner generates numerous GUI and application-related events and data. The real-time GUI monitoring connector 306 captures such events and data, and it provides such information to a business rule engine 310 that decides on an appropriate action. As needed, the desktop client 300 uses the generic web services connector 302 and the real-time database access connector to obtain data from other sources, and/or to provide the collected data to other sources.

As illustrated, the desktop client is typically loaded locally on the end-user's workstation. In the alternative, the client is located on a remote access server in the case of a remote access configuration. Control and data files are retrieved from the application server (such as server 200, in FIG. 2) and loaded by the client. Once loaded, the client is then configured and executes one or more business rules (in the business rules engine 310) required to support the real-time activity monitoring through the connected applications.

Figure 4:
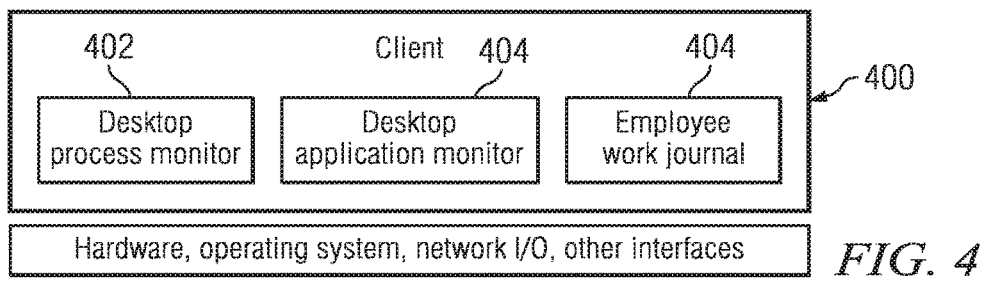
FIG. 4 is a block diagram of a process monitor and an application monitor of the desktop client application of this disclosure.
Figure 5:
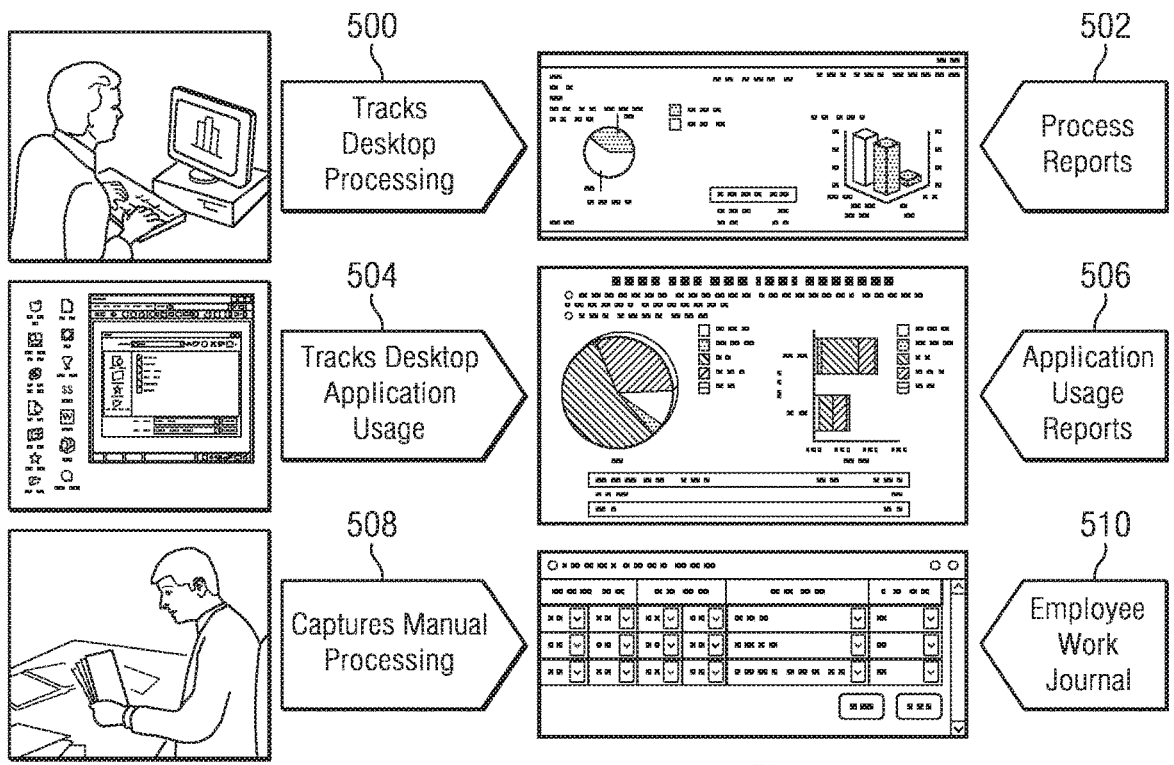
FIG. 5 illustrates the basic operation(s) of the process and application monitors of FIG. 4.

As seen in FIG. 4, the desktop client 400 typically comprises a desktop process monitor 402, and a desktop application process monitor 404, and an employee work journal 406. As noted above, these monitors and work journal may be discrete, or they may be integrated. The desktop process monitor (or "DPM") 402 typically runs in the background on the employee's workstation while he or she goes about his or her normal business activities. As active applications change, the illustrated components monitor applications and their states to determine the start and stop times of defined business processes performed by the employee. Moreover, and as will be seen, the DPM also tracks in-process pauses, idle time, and screen lock time to report actual handle times for the tasks that make up a complete process. The desktop application monitor 404 (or "DAM") is used to monitor which application an employee has in focus at any given time on the desktop. As shown in FIG. 2, this stream of information is used to populate the real-time feed to a workforce management (WFM) system.

If desired, an analysis of this feed may be performed in a real-time adherence view in a workforce management (WFM) display tool.

As can be seen, the above-described monitoring technique enables much more fine-grained data capture and display visualization as compared to known techniques. This data shows the actual work done by the employee with respect to each of the concurrent-handled business processes.

The system as described above may include an associated monitoring model that comprises database objects such as Processes, Tasks, and Desktop/Agent States. According to this model, a Process has a Process Dimension that comprises a number of self-defined attributes: Process Name, Process Unique ID, Queue Tag, Process Start Date, Process End Date, Application at Start, Browser URL at Start, Application at End, Window Caption at End, Browser URL at End, Process Start Day, Process Start Hour, Process Start Year, Process Start Month, and so on. Other date and timestamps may be used. The Processes also comprise Process Dimension Codes including a Process Code, a Process Instance Code, and a Process Project Code as well as Process Facts including a Process Handling Time, Process Hold Time and a Process Total Duration. A Task in the model comprises a Task Dimension that comprises a number of self-defined attributes: Task Name, Application, Window Caption, Browser URL, Task Event Type, Task Start Date, Task End Date, Task Year, Task Month, Task Day, and Task Hour. The Task model also includes Dimension Codes that include a Task Code, a Task Instance Code, and a Task Process Code. Task Facts include Task Handling Time, Task Hold Time, Task Total Duration, and Task Instances. The Desktop/Agent States in the model comprises an Agent State Events Dimension that comprises a number of self-defined attributes: Agent State, Agent State Start Date, Agent State End Date, and Agent State Duration. Other date and timestamps may be used. The following Agent States are representative and without limitation: logged-in, active, hold, idle, lock. These states are defined as:

Logged-in: the employee has logged in but is not in any process (active task or hold) and the desktop is not idle or locked.

Active task: the employee is performing active task of any process

Hold: the employee is in any process but not performing any active task

Idle: the desktop is idle, or the employee is in a process that is idle (and there is no other active task or process hold)

Lock: the desktop is locked.

The system may also implement an application usage model. This model comprises a Desktop Dimension that comprises a set of self-defined attributes: Application Name, Window Caption, Browser URL, Application Display Name, Window Caption Display Text, Browser URL Display Text, Activation Date (or other date and timestamps), and so forth.

Recording Method for Defining Processes and Tasks

The above-described system preferably includes a web-based (or standalone) configurator tool (sometimes referred to herein as Designer) that exposes to a user a set of display screens and interfaces. Using this tool, a user navigates to a Business Logic window tab, selects a New Process button, assigns a name to the process, and then defines the relevant screen elements to be used as triggers, the properties of the process, the one or more task(s) of the process that are to be monitored, the rules or events that may be designated to "start" and/or "stop" the monitoring for each task, and so forth. The result of this configuration is a process tree. The manually-entered information is then saved in a process object and instantiated by the desktop process and application monitors, as previously described.

While this approach works well, according to this disclosure an agent-session recording approach also can be used to define processes and tasks. The recording approach enables the system to record an agent's session and later use the recorded events to automatically generate the process tree in the Business Logic window tab (as opposed to generating the tree, or portions thereof, manually). The technique provides an additional, automated or semi-automated method for creating processes and tasks using the configurator tool.

Figure 6:
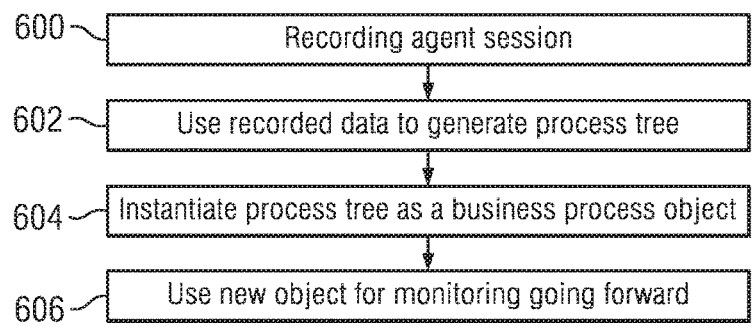
FIG. 6 illustrates a process according to this disclosure whereby an agent session is recorded and used to create a new process.

FIG. 6 is a process flow of the basic technique. Instead of using the configuration tool in a fully manual operation, the recording approach begins at step 600 by recording an agent session. The recording may begin at any time with respect to a given agent session, and all or part of a particular session may be recorded. As will be seen below, during or after the actual recording, a user may carry out various "process recording" actions (using a toolbar), and in response the system generates and characterizes the events that are occurring (or that have occurred) in the session. At step 602, the recorded data is processed to generate a process tree. At step 604, the process tree is then instantiated into a business process object, and, in step 606, this object is then used for subsequent monitoring, as previously described. In this manner, automated or semi-automated generation of business process objects are provided, which approach significantly reduces complexity and increases usability of the system. The recording method for defining processes and tasks approach as described herein may be used in lieu of the manual configuration approach, or to supplement it. The automated approach may also be implemented programmatically. Also, it may be offered as a managed (hosted) service, e.g., as a cloud-based service.

The technique for using the recording method to define processes and tasks is now described by way of an example display interface. These configuration screens as presented in this embodiment are not meant to be limiting, but they provide a basic understanding of one representative implementation of the automated design functionality.

Figure 7:
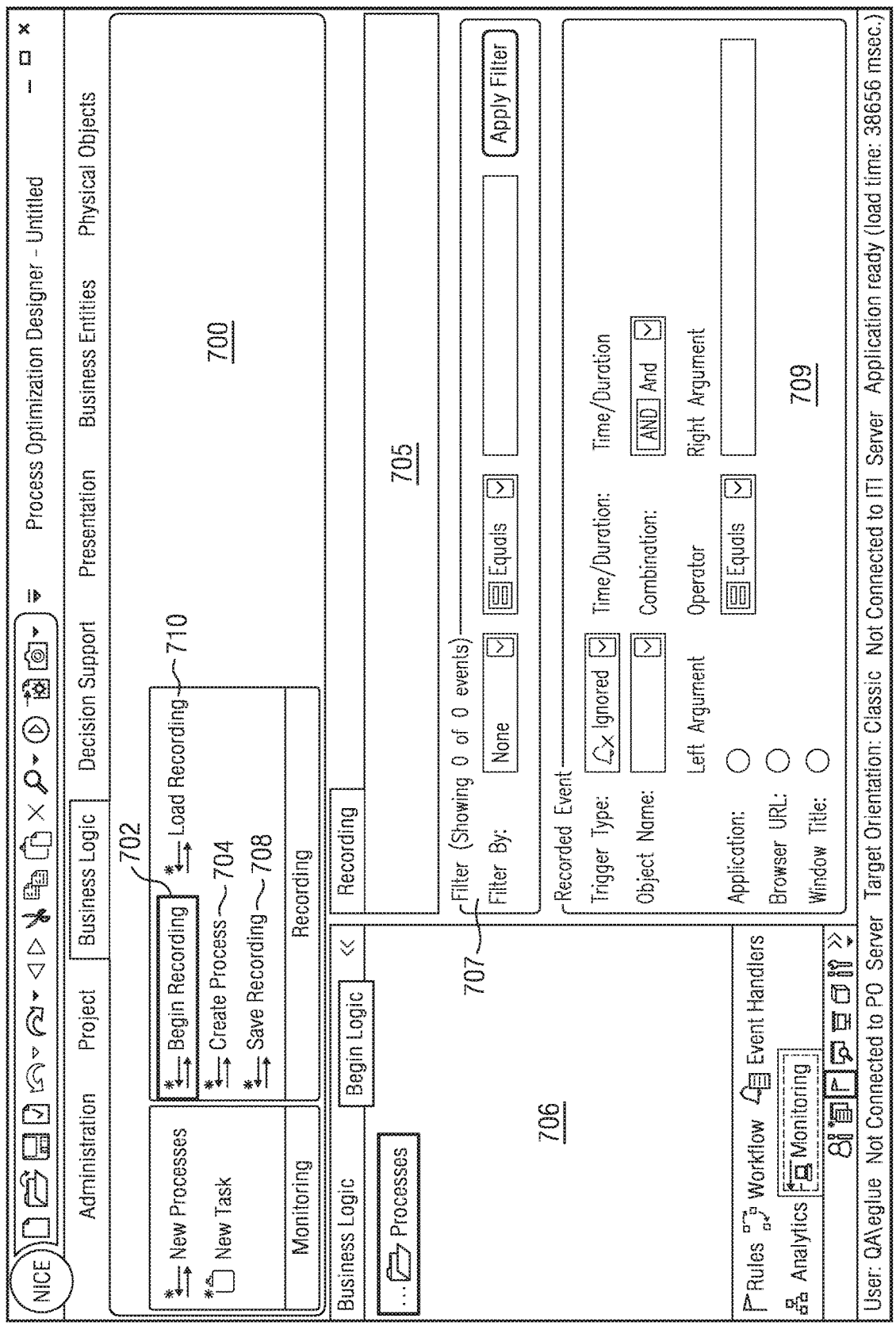
FIG. 7 illustrates a representative business logic window for use in the agent session recorder.

As seen in FIG. 7, a representative display interface includes a Business Logic window 700 with various navigation tabs, panes, and sub-panes. The panes include a Recording pane 705, a Business Logic pane 706, a Filter pane 707, and a Recorded Event pane 709, each of which will be described below.

Figure 8:
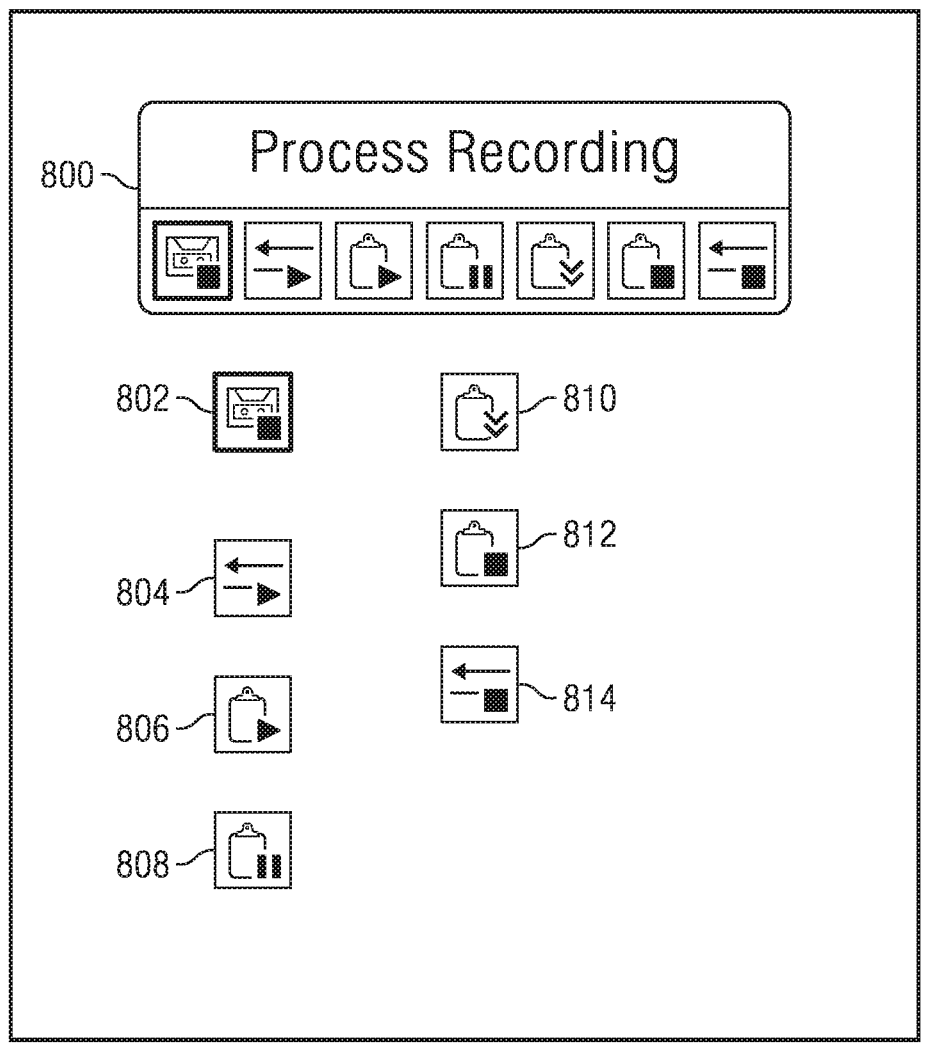
FIG. 8 illustrates a representative process recording toolbar.

The Begin Recording button 702 in the module tab bar 701 enables the user to begin recording an agent's session. Selection of this button displays a Process Recording toolbar, which is shown in FIG. 8 and described below. The Create Process button 704 creates a process tree in the Business Logic pane 706. As will be described below, the system validates the logic before creating the process tree. If the system determines that there is a problem creating a process, such as when a task is identified without a start condition, an error message is displayed. The Save Recording button 708 may be selected to save a recording (preferably as a *.csv file). The Load Recording button 710 loads a previously-saved recording. This action opens a standard file selection window in which the user can browse to select the required recording.

FIG. 8 illustrates the Process Recording toolbar 800. This toolbar is used to stop the recording process and to mark events with an applicable trigger type in the Recording pane 705 (see FIG. 7). Preferably, the Process Recording toolbar 800 includes a set of tools. The Stop Recording button 802 is selected to stop the recording. This action closes the toolbar and returns the user to Business Logic window. The Process Start button 804 enters a Process Start in the Trigger Type field for the selected event. The Task Start button 806 enters a Task Start in the Trigger Type field for the selected event. The Task Pause button 808 enters a Task Pause in the Trigger Type field for the selected event. The Task Resume button 810 enters a Task Resume in the Trigger Type field for the selected event. The Task Stop button 812 enters a Task Stop in the Trigger Type field for the selected event. The Process Stop button 814 enters a Process Stop in the Trigger Type field for the selected event.

To begin recording an agent session (i.e. the activities of the agent), the user clicks on the Begin Recording button 702 in the module tab bar. Once the recording process starts, all (or substantially all, or certain configurable) events are recorded continuously in the Recording pane 705 (FIG. 7) until the user clicks on the Stop Recording button 802 in the Process Recording toolbar 800.

FIG. 9 illustrates the data captured by the recording technique in a representative agent session. The top of the Recording pane 705 lists events recorded during the session, and each row preferably represents an event. Rows are created automatically each time an event is detected in the active application (the application that has the window focus). For example, and as illustrated, the Recording pane 705 shows the following series of events, which, of course, are merely representative: (1) Microsoft Word was the initial application in focus; (2) the calculator was opened and became the focus; (3) Internet Explorer was started and the "www.ynet.co.il" page was opened; (4) the calculator became the application in focus; (5) Microsoft Word became the application in focus, and so on. By selecting a tool in the Process Recording toolbar, a value is entered into the Trigger Type field in the Recording pane for that row, and a default name is assigned in an Object Name column. If no tools were clicked on in the Process Recording toolbar while recording, there will be no value in the Object Name column and "Ignored" is displayed in the Trigger Type field.

As can be seen in FIG. 9, preferably the Recording pane 705 comprises the following columns of information for each event. The Application column 902 specifies the name of the application in focus. The Window Title column 904 specifies the name as shown in the window title bar. The Browser URL column 906 specifies the URL in the browser. The Selection column 908 indicates whether the event is for an application, a browser URL or window title. The Time column 910 specifies the time when the event was received by the recorder, namely, the start time for the event. The Duration column 912 specifies the duration of the event, e.g., how long a specific window remained open. The Object Name column 914 specifies the name of the process. This value becomes the name of the process in the process tree that is generated by the Create Process button (button 704, in FIG. 7) option in the module tab bar. In the Object Name column, the user can specify a new process/task name, or select a name already specified. A default name of a new process or task may be provided. The Trigger Type column 916 indicates how to classify the event, e.g., Process Start, Process Stop, Task Start, Task Stop, and so on. These classifications are identified when the user clicks the respective tool in the Process Recording toolbar 800. In particular, when the tool is clicked, the Trigger Type field for the selected event is automatically updated to reflect the trigger type designated by that tool. For example, when the user clicks the Task Start tool (button 806, in FIG. 8), the value Task Start is automatically entered in the Trigger Type field for the event. The Operator column 918 is used to specify a logical condition that applies in an expression, such as "equals," "does not equal", "matches," "does not match," and so on. A drop-down menu (FIG. 10) may be used for this selection.

Figures 10, 11:
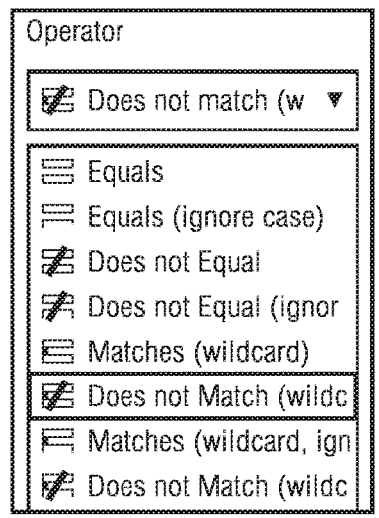
FIG. 10 illustrates an operator drop-down menu for use in the recording pane.
FIG. 11 illustrates a portion of a filter pane for use in the recorder.

Referring back to FIG. 9, a Right Argument column 920 specifies the term on the right side in an expression. Wildcards can be used to build expressions. FIG. 11 illustrates the Filter pane 707 that can be used to create a filter expression. This feature is described in more detailed below with respect to FIG. 15.

Referring back to FIG. 9, a Combination column 922 specifies two values in the Trigger Type column with an AND or an OR operation. For example, FIG. 12 illustrates four (4) rows with the object name "task 1"—two tasks with the Task Start Trigger Type and two tasks with the Task Stop Trigger Type. The user can combine the two Task Starts with an AND condition between them, and combine the two Task Stops with an OR condition between them, as shown in FIG. 13. For such combinations, which are merely representative, both trigger types do not need to have an OR operations to cause OR behavior. It is sufficient that the second one or both use an OR operator. In such cases the first value in the Combination column 922 in then ignored.

As seen in FIG. 14, when working with the recorder, the user either can use the tools in the Process Recording toolbar while recording the session, or later select rows in the Recording pane 705 and edit the information at the bottom of the window in the Recorded Event pane 709. For example, if the agent processes being recorded are too long, the user may want to use the tools in the toolbar to fill in the Trigger Type column as the user moves through the process. Using the toolbar while the agent is working is helpful to indicate to the user what was happening at the time. Typically, the user will need to go back and fill in the Object Name at the end of the recording session. In an alternative embodiment, the user is prompted for the Object Name when the toolbar is clicked.

Figures 15, 16, 17:
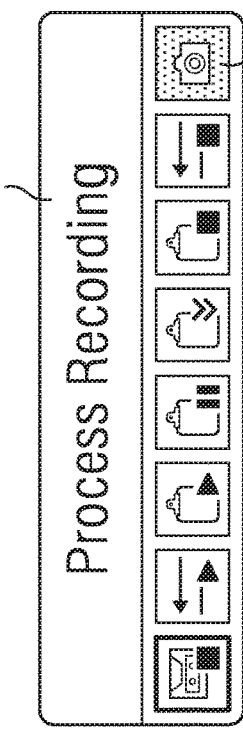
FIG. 15 illustrates the filter pane of the display interface.
FIG. 16 illustrates the recorded event pane of the display interface.
FIG. 17 illustrates a variant of the process recording toolbar in an alternative embodiment wherein the recording process can capture a screenshot of the active application or page to enable bookmarking of a screen element therein.

FIG. 15 illustrates the Filter pane 707 at the bottom of the window. This pane displays each recorded event one-by-one, and the user can step through each event as desired. As noted above, this pane enables the user to filter the information displayed in the Recording pane 705. To this end, the user simply creates a filter (by defining filter criteria) and then selects an Apply Filter button 1502. This action causes the display of filtered results in the Recording pane 705. In particular, the "Filter By" option in the Filter pane enables the user to filter the visible recorded event lines by: None, Application, Window Title, URL, Duration, Object Name and Trigger Type. The user can select a filter criteria operator according to the selected "filter by" option. The user can also select the filter criteria operand value. Clicking the Filter button applies the filter options.

FIG. 16 illustrates the Recorded Event pane 709 in more detail. As noted above, the Recorded Event pane 709 at the bottom of the window displays details for event selected in the Recording pane 705. This area is used to edit one or more parameters for the selected event. Any modifications made in this pane are then reflected in the Recording pane 705. For example, and as shown, the user can select a task in the Trigger Type field and then enter a name for it in the Object Name field by typing in or by selecting a name from a drop-down list that identifies other tasks with the same process.

The system enforces a set of validation rules during recording. The first specified event must be a Process Start, and a Process Stop is mandatory as well. Task Pause must have a preceding Task Start. A Task Resume must have a preceding Task Pause, and a Task Resume is mandatory following a Task Pause. Task Stop is optional.

As noted above, the user may associate multiple event rows (lines) with the same trigger and specify the associated and/or combination.

The one or more display panes as described may be configured as separate display windows or other display interface widgets. The display is generated using software routines in a conventional manner. The agent session is captured using one or more components such as described above with respect to FIG. 1. The recorder itself preferably is implemented in software as well.

The recording approach is quite advantageous. It enables the system to record the agent's application usage actions to generate a template of a process object, and that template may include one or more tasks and the one or more triggers for the start, stop, pause and/or resume operations of a process and of each of the tasks. As has been described, upon selection of the Begin Recording function, the recording of application events is initiated. The design window may be hidden at this point, although the Process Recording toolbar is displayed, preferably as a floating toolbar. As the user makes various selections (except Stop Recording), the current active application/screen/URL in the recording log adds the corresponding Trigger Type into the associated event. When the Stop Recording button is selected, the recording of application activation events stops, and the list of application activation events and trigger types that were captured in the recording session are then presented to the user. In one embodiment, none of the radio buttons are selected and the trigger type is set to "Ignored." As the user clicks on the tools (in the Process Recording toolbar), the trigger type(s) are updated accordingly. The Recording pane shows when the process tree root will be placed in selection. When the recording process is complete (and any post-recording operations are done), the user clicks on a Create Process 704 (FIG. 7) button. This creates a new process object along with all the specified tasks, and the process so created is populated into the Business Logic pane 706. It also applies a condition for each of the application usage events that were specified as a trigger (where a radio button and object name selection was made).

Capturing Screen Elements

As described above, the process recording captures active screen/application/URL events very efficiently, although in some cases the user needs to manually specify screen element events (and/or construct a business entity (BE) object to represent screen element values in conditions). In an alternative embodiment, which is now described, the user is able to define any process (end-to-end), with no such requirements. In particular, this enhancement extends the basic process recorder function described above to enable the user to capture screenshots (of the application or page, or components therein) and to consider events and data of known screen elements.

According to this embodiment, during a recording session, preferably every active screen event is or may be accompanied by a screenshot, and each screen element (SE) that exists in the project (and in referenced projects) is available for bookmarking (i.e. identified as it would be in real-time). To facilitate this alternative embodiment, the process recorder toolbar is augmented to include a camera button, and the recorder is provided with an additional assignment tool display interface by which screen element (s) can be bookmarked.

Figures 18, 19, 20:
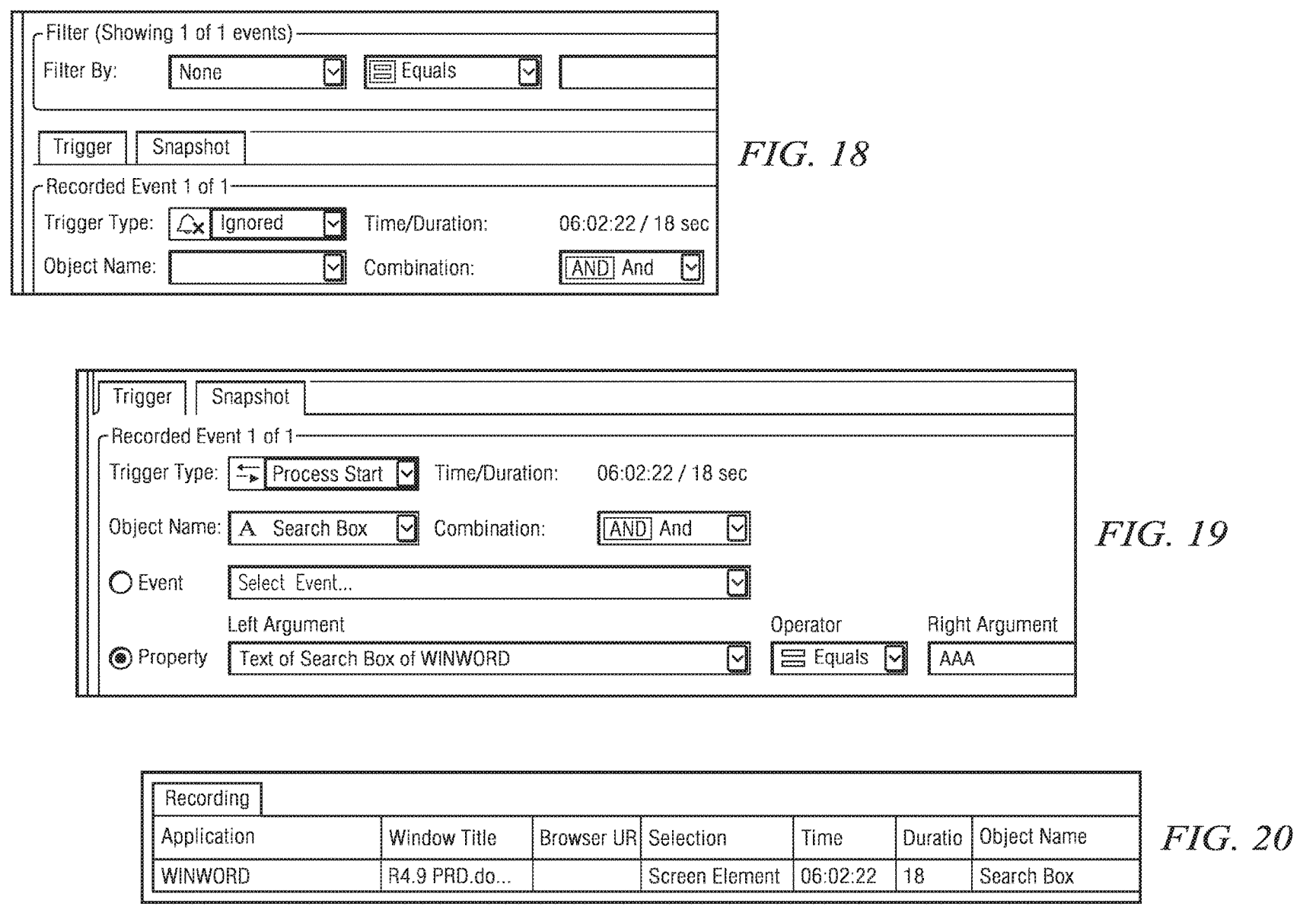

FIG. 17 illustrates the embodiment, with the toolbar 1700 including the buttons as previously described together with additional camera button 1702. During the recording session, the user clicks on the desired screen element (SE). If the SE is identified, the screen element assignment tool is presented to the user showing various bookmarking options that may then be associated with the selected screen element. If the SE is not identified, the system attempts to capture the SE by comparing the SE to elements it has previously seen and categorized. If the system can capture the SE, once again the assignment tool is presented; otherwise, the system presents an error message. When presented with the assignment tool, the user can bookmark the SE by one or more actions, namely: identifying a Trigger Type (e.g., task/process start/stop/pause/resume), provide an associated Object Name, associate an event with the screen element, define a property associated with the screen element, and combinations thereof. If no selection is made, the SE is then identified (in the Trigger Type) as Ignored. FIG. 18 illustrates the assignment tool in a representative implementation. In this case, the user has not bookmarked the SE; thus, the Trigger Type is identified as Ignored. Selection of an associated Snapshot tab (as shown in FIG. 18) brings up the snapshot (not shown).

Assume that the user has bookmarked the particular screen element in the manner shown in FIG. 19. In this example, the SE bookmark identifies the Trigger Type as Process Start, and the property has been defined as "Text of Search Box of WINWORD" equal to "AAA." FIG. 20 illustrates this SE bookmark presented as a line in the events pane. In this example, the Application column displays the name of the root process of which the SE is a descendent, and the Window Title column displays the name of a topmost window of which the SE is a descendant.

At the point of process generation, every SE bookmark that was selected as a triggering condition/event is represented within the process/task properties as a reference to a property of a library instance that represents the SE's property.

When saving a process recording session's data to file, preferably the screen activation events are saved together with the screenshots.

More generally, the disclosed technique provides significant advantages in that it enables the enterprise (in general) or the operator (in particular) to track employee productivity accurately so as to improve operational efficiencies in the workplace. The techniques enable fine-grained tracking and management of employee performance, as well as the automated (or semi-automated) generation of process object(s) to be tracked. The data collection techniques are readily integrated with other performance management and scheduling systems, which enables improved forecasting and scheduling for back office, middle office and front office. Many organizations have work that blurs the lines between the front office and back office. Where the front office has direct customer contact and some non-customer contact work, the back office is typically non-customer contact work. Therefore, the term, "middle office", has been created to describe work that involves both customer contact and non-customer contact work. Regardless, RTAM provides benefits for all departments regardless of whether they do front, middle or back office work. The display views provide a better overall view of work levels and staffing levels.

The subject matter of this disclosure may be added to a workforce management system, a back office system, a performance management system, a quality management system, or the like, as an add-on option. Or, it may be implemented as a standalone application, or a hosted (managed) service. It also provides a new tool for managing agent performance (performance management) and agent quality of service (quality management).

More generally, a system environment in which the method and system of the invention may be implemented includes a set of computing-related entities (systems, machines, processes, programs, libraries, functions, or the like) that facilitate or provide an agent-supervisor network. In a typical implementation, the environment typically comprises a set of computers. A representative machine is a client workstation or a network-based server running commodity (e.g. Pentium-class) hardware, an operating system (e.g., Linux, Windows 2000, OS-X, Ubuntu, or the like), an application runtime environment (e.g., Java), and a set of applications or processes (e.g., Java applets or servlets, linkable libraries, native code, or the like, depending on platform) that provide the functionality of a given system or subsystem. A client machine typically includes a Web browser (Internet Explorer, Google Chrome, Apple Safari, Mozilla Firefox, or the like) or other rendering engine. A Web browser typically includes or supports media players and other plug-ins. Conveniently, information may be provided on a workstation using a Java-based applet or application.

It is further noted that, unless indicated otherwise, all functions described herein may be performed in either hardware or software, or any combination thereof. In a preferred embodiment, the functions are performed by one or more processors executing given software.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The disclosed subject matter can take the form of an entirely hardware embodiment, an entirely software embodiment, or an embodiment containing both hardware and software elements. In one preferred embodiment, the rule definition interface and data state sequence comparisons are implemented in software executing in one or more server machines. Each server may have one or more processors. The disclosed subject matter (or portions thereof) may take the form of a computer program product accessible from a computer-usable or computer-readable medium providing program code (instructions) for use by or in connection with a computer or any instruction execution system. A computer-usable or computer readable medium can be any device or apparatus that can store the program for use by or in connection with the instruction execution system, apparatus, or device. The computer-usable or computer readable medium is tangible. The medium can be an electronic, magnetic, optical, or the like. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

Having described our invention, what we now claim is as follows.

The invention claimed is:

1. A method for generating a process object for monitoring one or more computer applications, the method comprising:
    initiating, by a processor, recording of a computer session;
    capturing, by the processor, a set of events associated with the computer session, at least one of the set of events being a screen activation event having an associated screenshot;
    automatically generating, by the processor, a process tree based on the captured set of events including the screen activation event;
        wherein the process tree comprises an associated monitoring model, the monitoring model comprising a plurality of database objects; and
        wherein a database object comprises at least one of a process having a process dimension, a task having a task dimension, and a desktop/agent state having a desktop/agent state dimension, each of the process dimension, the task dimension, and the desktop/agent state dimension comprising attributes of business processes;
    instantiating, by the processor, the process tree into an application monitoring process object;
    using, by the processor, the application monitoring process object for a subsequent monitoring of the one or more applications; and
    providing, by the processor, data generated from the subsequent monitoring activity using the application monitoring process object to improve one of: a workforce management system, a back office system, a performance management system, and a quality management system.

2. The method of claim 1 further comprising:
    for at least one event in the set of events, receiving, by the processor, first data classifying the event.

3. The method of claim 2 wherein the first data is data indicative of one of: a process start, a process stop, a task start, a task pause, a task resume, and a task stop.

4. The method of claim 1 comprising displaying a table of the set of events, wherein a row in the table is associated with a given event.

5. The method of claim 4 wherein the table comprises a set of columns.

6. The method of claim 5 wherein the set of columns includes one of: an application column specifying a name of an application then in focus, a window title column specifying given information as shown in a window title bar for the application in focus; and a browser URL column specifying a URL if the application in focus is a browser opened to the URL.

7. The method of claim 5 wherein the set of columns includes a column that indicates a type of event.

8. The method of claim 5 wherein the set of columns includes one of: a time column that specifies a start time for the event, and a duration column that specifies duration of the event.

9. The method of claim 5 wherein the set of columns includes a trigger type.

10. The method of claim 9 wherein the trigger type is one of: a process start, a process stop, a task start, a task pause, a task resume, and a task stop.

11. The method of claim 4 comprising displaying a filter pane by which data displayed in one or more rows of the table are filtered against user-defined criteria.

12. The method of claim 4 comprising displaying a recorded event pane by which data displayed in a given row of the table is modified.

13. The method of claim 1 further comprising:
capturing, by the processor, the screenshot; and
receiving, by the processor, data classifying a screen element associated with an active application or page.

14. The method of claim 13 wherein the data classifying the screen element comprises a property having a condition parameter, or an event.

15. The method as in claim 1, comprising:
receiving real-time data about processes and active applications from a plurality of client computers;
storing the real-time data within an associated server database;
packaging the real-time data; and
sending historical feeds to populate queue history on a workforce management system.

16. The method as in claim 15, wherein each of the plurality of client computers is configured to send the real-time data to an aggregator.

17. The method as in claim 16, comprising:
consolidating by the aggregator the real-time data from the plurality of client computers into a single real-time feed; and
populating with the real-time feed one or more real-time enabled display views exported by the workforce management system.

18. The method as in claim 17, comprising analyzing the real-time feed in a real-time adherence view in a workforce management display tool.

* * * * *